(12) United States Patent
Kurian et al.

(10) Patent No.: US 10,942,556 B2
(45) Date of Patent: Mar. 9, 2021

(54) EARLY PRE-CHARGE ENABLEMENT FOR PEAK POWER APPLICATION IN NET ZERO ENERGY DEVICES

(71) Applicant: Intel Corporation, Santa Clara, CA (US)

(72) Inventors: Dileep J. Kurian, Bangalore (IN); Ankit Gupta, Bangalore (IN); Akhila M, Bangalore (IN); Tanay Karnik, Portland, OR (US); Vaibhav Vaidya, Portland, OR (US); David Arditti Ilitzky, Zapopan (MX); Christopher Schaef, Hillsboro, OR (US); Sriram Kabisthalam Muthukumar, Bangalore (IN); Harish K. Krishnamurthy, Hillsboro, OR (US); Suhwan Kim, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 215 days.

(21) Appl. No.: 15/682,724

(22) Filed: Aug. 22, 2017

(65) Prior Publication Data

US 2019/0064907 A1    Feb. 28, 2019

(51) Int. Cl.
| | |
|---|---|
| *G06F 1/3203* | (2019.01) |
| *G06F 1/3212* | (2019.01) |
| *G06F 1/26* | (2006.01) |
| *H02J 7/34* | (2006.01) |
| *H02J 7/00* | (2006.01) |

(52) U.S. Cl.
CPC .............. *G06F 1/3203* (2013.01); *G06F 1/26* (2013.01); *G06F 1/3212* (2013.01); *H02J 7/007* (2013.01); *H02J 7/345* (2013.01)

(58) Field of Classification Search
None
See application file for complete search history.

(56) References Cited

U.S. PATENT DOCUMENTS

| | | | |
|---|---|---|---|
| 6,349,386 B1 * | 2/2002 | Chan ..................... | G06F 1/1613 713/1 |
| 2001/0005124 A1 * | 6/2001 | Odeohhara ............. | G06F 1/263 320/116 |
| 2004/0149740 A1 * | 8/2004 | Kishi .................. | G03G 15/2039 219/660 |
| 2006/0125446 A1 * | 6/2006 | Tupman ................ | G06F 1/3203 320/132 |
| 2012/0084584 A1 | 4/2012 | Lee | |

(Continued)

OTHER PUBLICATIONS

International Search Report and Written Opinion for International Patent Application No. PCT/US2018/047216, dated Nov. 28, 2018, 15 pages.

(Continued)

*Primary Examiner* — Paul Yen
(74) *Attorney, Agent, or Firm* — Jordan IP Law, LLC

(57) ABSTRACT

Systems, apparatuses and methods may provide for early pre-charge with respect to peak power events. Application performance may improve by pre-charging a supercap just prior to initiating a system wake up from a qualified system wake-source trigger. Additionally, the pre-charging of the supercap may be controlled by a time defined pre-charge period and may also be controlled by a predetermined threshold voltage.

22 Claims, 9 Drawing Sheets

(56) References Cited

U.S. PATENT DOCUMENTS

| | | |
|---|---|---|
| 2012/0271468 A1 | 10/2012 | Doljack |
| 2013/0110432 A1 | 5/2013 | Mickelsen |
| 2015/0006916 A1 | 1/2015 | Knoth et al. |
| 2017/0060224 A1 | 3/2017 | Cao et al. |
| 2017/0090537 A1* | 3/2017 | Elad .................. G06F 1/266 |

OTHER PUBLICATIONS

International Preliminary Report on Patentability for International Patent Application No. PCT/US2018/047216 dated Mar. 5, 2020, 11 pages.

* cited by examiner

US 10,942,556 B2

EARLY PRE-CHARGE ENABLEMENT FOR PEAK POWER APPLICATION IN NET ZERO ENERGY DEVICES

TECHNICAL FIELD

Embodiments generally relate to power management for computing loads. More particularly, embodiments relate to providing power management for net zero energy (NZE) computing devices needing higher peak power during certain operations.

BACKGROUND

Low power computing solutions, such as NZE harvesting devices may rely greatly on efficient usage of available power. These devices may use the energy harvested from various sources to power an entire system. For most of the cases with large differences between average and peak (short-term) power consumption, the energy harvesting and the system battery may not be capable of satisfying peak power requirements (e.g., due to battery chemistry and harvesting capacity) and hence techniques such as super capacitors (e.g., "supercaps") may be employed.

Supercaps may be connected in parallel with the battery to hold the additional (e.g., peak) instantaneous charge drawn by the system. Conventionally, supercaps may be connected directly to the charging circuitry, which—due to the leaky nature of supercaps—may reduce the energy efficiency of the system. A direct alternative may be to nominally leave the supercap discharged, and pre-charge it only shortly before the peak power drain will be exercised. Controlling this "just-in-time" pre-charging of the supercap when the NZE system is active may also lead to energy inefficiencies (e.g., many circuits are powered-up while just waiting for the supercap to charge). Additionally, the supercap parallel connection to the battery means that the supercap is used as a decoupling capacitor rather than a store of energy. For example, if the open circuit voltage of the battery is 3.2V, a supercap that is nominally rated for may be charged to only 3.2V and used to lower the impedance presented by the battery.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Technology described herein may solve the problem of just-in-time supercap pre-charging that is constrained to minimizing the power consumption while pre-charging takes place, and constrained to maximizing supercap efficiency or equivalently minimizing supercap size (e.g., charging the supercap to its full nominally rated voltage).

Net zero energy (NZE) systems may be at the least power consuming state as much time as possible. Therefore, transitioning from a sleep state to an active state may only occur when enough charge has been stored to execute the required task immediately after wake-up (e.g., without waiting for supercap to charge). To efficiently support large differences between peak and average power consumption in NZE systems, the basic principles of the proposed IP are twofold: first, enabling supercap charging up to its maximum terminal voltage (if needed) and minimizing the size of supercap required for a given output energy peak and minimizing charging time for the required peak energy. Second, a two-stage wake-up process may be used to conduct supercap pre-charging in which the first stage corresponds to a wake-condition being asynchronously activated and qualified by battery charge level and the second stage handles just-in-time supercap pre-charging (e.g., temporarily connecting the supercap to the charger, while delaying the wake-up until supercap is charged).

The above process enables the just-in-time pre-charging of the supercap to occur during a sleep state, and just before transitioning to an active state. The proposed supercap pre-charging may be controlled by either a scheduled pre-charging period (e.g., tuned for worst case scenario recharge times) or a state-of-charge monitoring threshold (e.g., tuned for the exact charge requirement), in such a way that the peak power requirement is met while remaining in the least power consuming state for most of the system cycle. Peak power requirements for the system, wake-conditions for each of the software tasks expected to be running during peak power events, and an estimate for the worst time required to charge the supercap to the required levels for scheduled based control, may be utilized to achieve the pre-charging control. Using this information, a power management unit (PMU) may configure a supercap pre-charge level or configure a supercap pre-charge time period to control an amount of energy stored within the supercap for use during peak power events.

Figure 1:
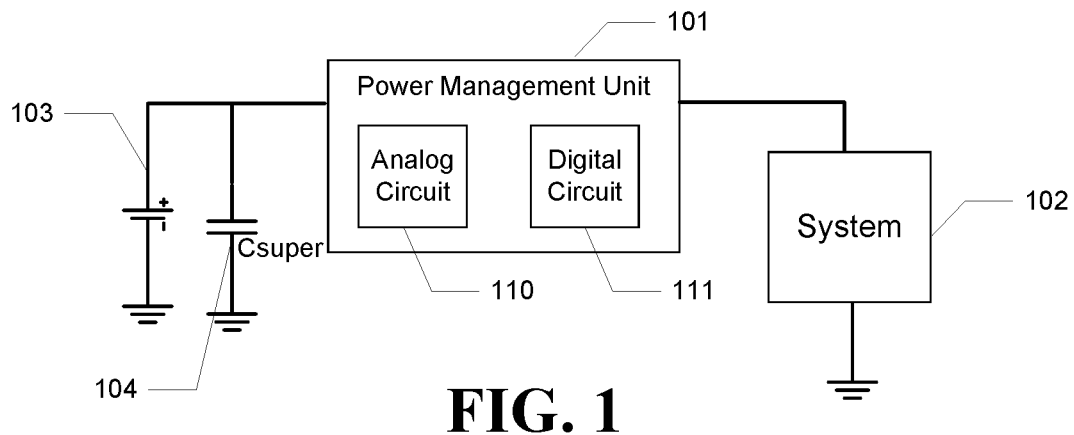
FIG. 1 is a block diagram of an example of a power management system according to an embodiment.

Turning to FIG. 1, a block diagram of an example of a power management unit according to an embodiment, a PMU 101 provides electrical power to a system 102 by selectively connecting a power source such as a battery 103 in parallel with a supercap 104. PMU 101 includes an analog control circuit 110 and a digital control circuit 111 to selectively connect the battery 103 and supercap 104 to system 102 as needed. The analog control circuit 110 and the digital control circuit 111 work together to charge the supercap 104 at the appropriate time to permit it to provide additional charge to system 102 during periods of higher power needs. As noted above, the supercap 104 may be most efficiently utilized if it is pre-charged immediately before use to prevent wasting of charge through the supercap 104 in the form of leakage current. The use of the terms analog control circuit and digital control circuit herein are for the purposes of distinguishing them from each other and not to otherwise limit their meaning as described herein wherein the term digital is based upon the programmable features of the digital control circuit 111. All of the features and usage of these terms are described herein as they are to be interpreted with regard to any embodiment.

Figure 2:
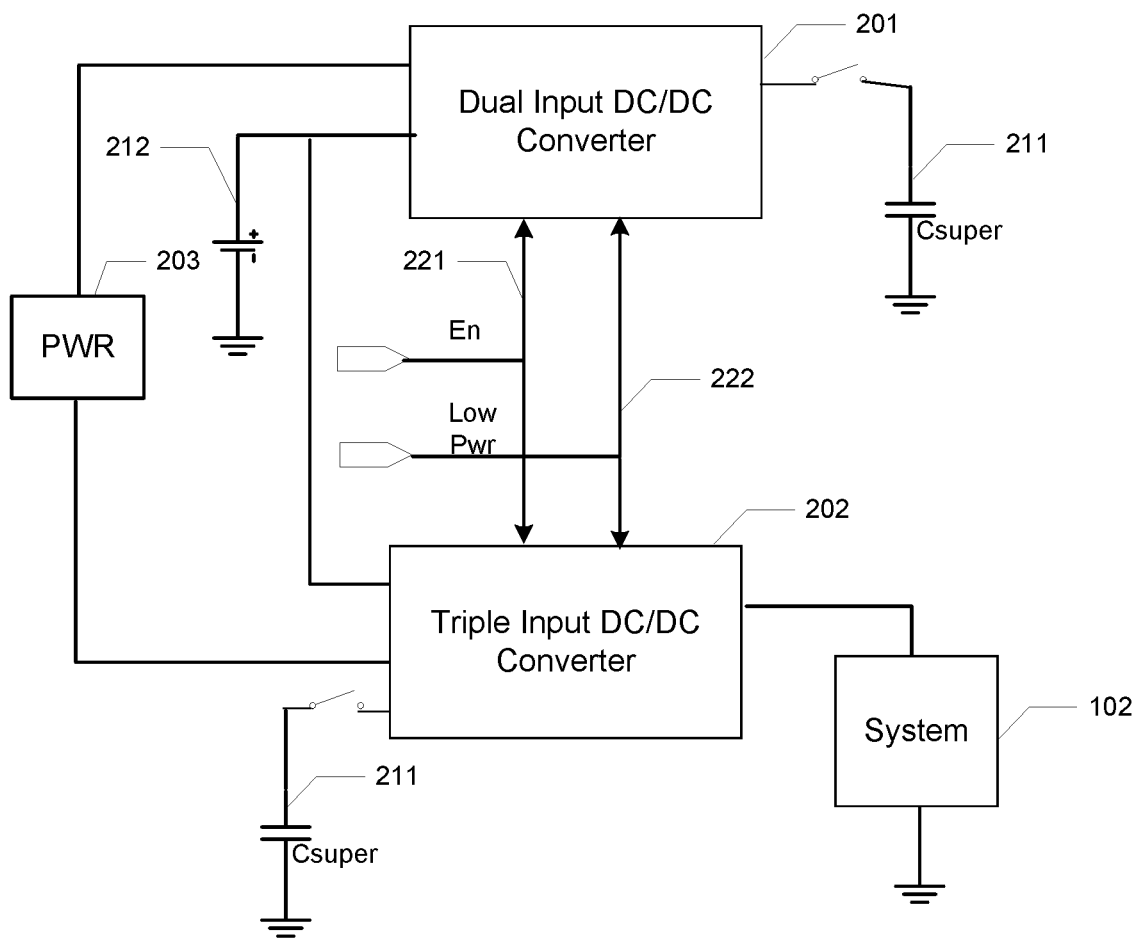
FIG. 2 is a block diagram of another example of a power management system according to an embodiment.

FIG. 2 is a block diagram of an example of an analog control circuit within the power management unit according to an embodiment. The analog control circuit 110 includes a dual input DC/DC converter 201, a triple input DC/DC converter 202, a harvesting power source 203 coupled to both the dual input DC/DC converter 201 and the triple input DC/DC converter 202, a rechargeable battery 212 coupled to the dual input DC/DC converter 201, a supercap 211 coupled to the dual input DC/DC converter 201 and also coupled to the triple input DC/DC converter 202, and a pair of control signals, Pre-charge Enable signal 221 and Low Power State signal 222 coupled to both the dual input DC/DC converter 201 and the triple input DC/DC converter 202. The two control signals 221, 222 determine an operational mode for the dual input DC/DC converter 201 and the triple input DC/DC converter 202 during operation. Each of these operational modes are described in additional detail with respect to FIGS. 3A-D below.

In all of these mode examples, supercap 211 is shown to be located both next to dual input DC/DC converter 201 and next to triple input DC/DC converter 202. This supercap 211 is in fact a single device shown here as two devices for convenience. When the supercap 211 is coupled to either converter 201, 202, it is shown coupled by a solid connected line. When the supercap 211 is not electrically coupled to either converter, the connection is shown to have a break as an open switch. While the break may be shown as a switch of illustration purposes, the break is meant to be a logical construct in which the supercap 211 is electrically coupled and electrically decoupled from the two converters 201, 202. The operation of the coupling mechanism to connect and disconnect the supercap 211 from the converters 210, 202 is controlled by Pre-charge Enable signal 221 and Low Power State signal 222 control signals.

The harvesting power source 203 may include a photovoltaic cell regulated to its nominal maximum power point with a capacitor to smooth its terminal voltage, or a thermoelectric generator with a similar capacitor, or any energy harvesting device that provides a maximum power output typically much smaller than what the system can demand in a high load condition, but more than what the system consumes during sleep periods. In all of these modes, battery 212 provides power at its rated terminal voltage which may be in the range of 2.7 to 4.2 volts for example for a lithium ion chemistry in typical embodiments where the lower limit of 2.7 volts ensures that it retains sufficient charge and safe operation.

Figure 3A:
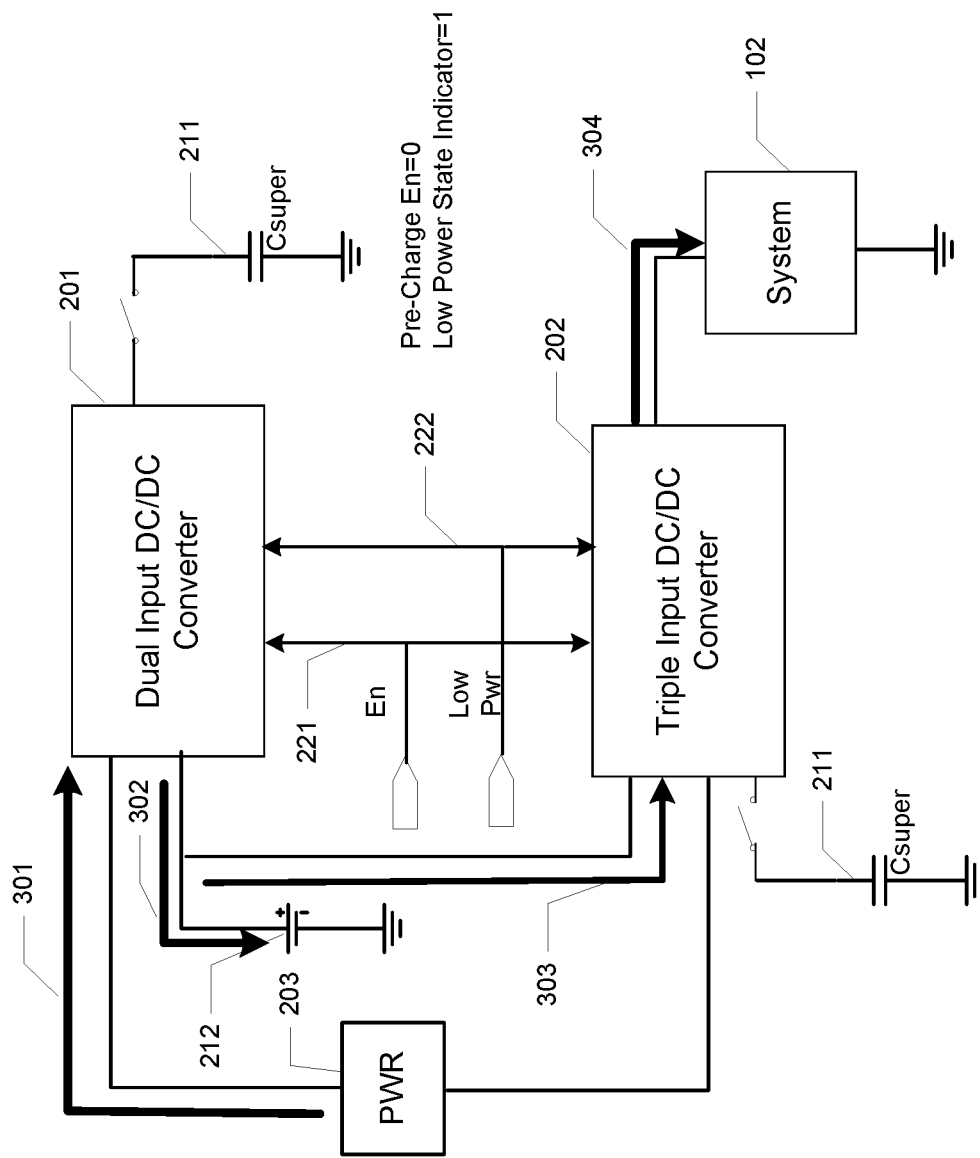
FIG. 3A-3D are block diagrams of an example power management system indicating the flow of charge at various states of operation according to an embodiment.

FIG. 3A-3D are block diagrams of an example operation of the analog control circuit within the PMU power management system indicating the flow of charge at various states of operation according to an embodiment. FIG. 3A illustrates the analog control circuit 110 operating in a sleep/low power mode that is harvesting power to battery 212. During the non-pre-charging sleep/low power mode, battery 212 is being charged from the harvesting power source 203 and the system 102 is provided enough power to keep the system operating in a sleep mode. This low power mode typically corresponds to cases in which only average power consumption (i.e. not peak power consumption) is to be exercised by the system upon wakeup.

In the sleep/low power mode, Pre-charge Enable signal 221 may be set to a 0 and Low Power State signal 222 may be set to 1 in this embodiment. Dual input DC/DC converter 201 is electrically coupled to harvesting power source 203 to receive power 301 that may be passed as power 302 to battery 212. Triple input DC/DC converter 202 is electrically coupled to battery 212 to receive power 303 which is transmitted to system 102 as a power source 304. In most situations, the power 302 flowing to the battery 212 from dual input DC/DC converter 201 is generally greater than the power 303 flowing from the battery 212 to triple input DC/DC converter 202 as the battery 212 is expected to be charging rather than discharging since power consumption of system 102 is minimal during the sleep/low-power mode.

In this mode, neither dual input DC/DC converter 201 nor triple input DC/DC converter 202 are electrically coupled to supercap 211. Triple input DC/DC converter 202 may or may not be receiving charge from harvesting power source 203. The power 301 from the harvesting power source 203 is provided by dual input DC/DC converter 201 to the connection of the battery 212 and triple input DC/DC converter 202. If the power 303 consumed by triple input DC/DC converter 202 is less than the power 302 provided by the dual input DC/DC converter 201, battery 212 may be charging. If the power 303 consumed by triple input DC/DC converter 202 is greater than the power 302 provided by the dual input DC/DC converter 201, battery 212 may provide the additional power needed.

Figure 3B:
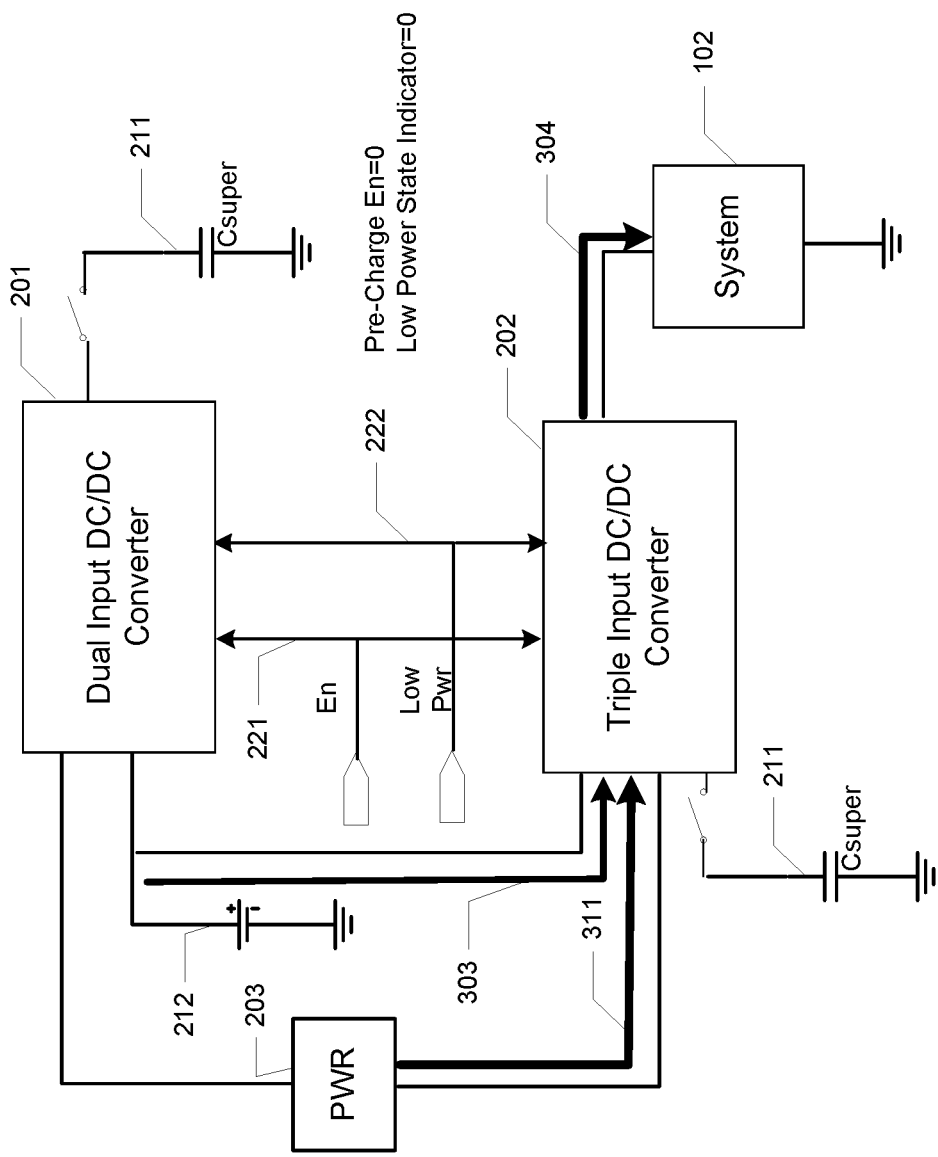

FIG. 3B illustrates the analog control circuit 110 operating in a non-pre-charged active system low power required mode. During the non-pre-charged active system low power required mode, battery 212 is providing power 303 to triple input DC/DC converter 202, harvesting power source 203 is also providing power 311 to triple input DC/DC converter 202, and the system 102 is provided enough of a power source 304 by triple input DC/DC converter 202 to keep the system operating in the active low power state. This mode supports the system 102 during average power consumption, as opposed to peak power consumption, and therefore supercap was not pre-charged for the wakeup event.

In non-pre-charged active mode, Pre-charge Enable signal 221 may be set to a 0 and Low Power State signal 222 may be set to 0 in this embodiment. Triple input DC/DC converter 202 is electrically coupled to battery 212 to receive power 303, and simultaneously electrically coupled to harvesting power source 203 to receive power 311. The received power is transmitted to the system 102 as a power source 304.

In this mode, neither dual input DC/DC converter 201 nor triple input DC/DC converter 202 are electrically coupled to supercap 211. Triple input DC/DC converter 202 may also be receiving charge from harvesting power source 203. Although not shown, dual input DC/DC converter 201 may also be receiving power from the harvesting source 203. If the harvesting power source 203 availability is periodically out of sync with system energy need, the harvesting power source 203 will provide power to the battery 212 first and the system 102 may draw power 303 from the battery 212.

Figure 3C:
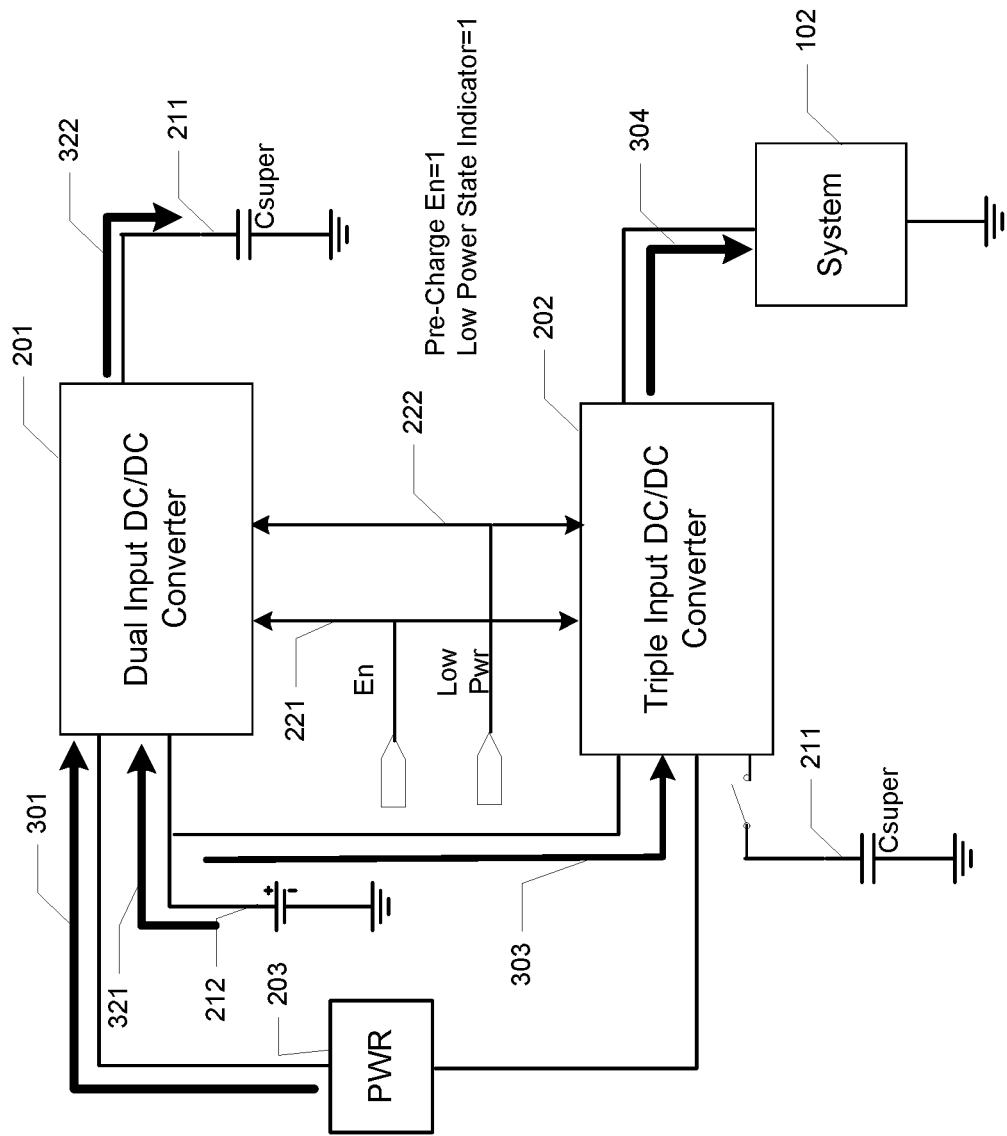

FIG. 3C illustrates the analog control circuit 110 operating in a pre-charging sleep/low power mode that is pre-charging supercap from harvesting power source 203 and battery 212. In the pre-charging sleep/low power mode, Pre-charge Enable signal 221 may be set to a 1 and Low Power State signal 222 may be set to 1 in this embodiment. Dual input DC/DC converter 201 is electrically coupled to harvesting power source 203 to receive power 301 that may be passed as power 322 to pre-charge supercap 211. Battery 212 is also electrically coupled to dual input DC/DC converter 201 to provide power 321 that may also be passed as power 322 to pre-charge supercap 211. Triple input DC/DC converter 202 is electrically coupled to battery 212 to receive power 303 which is transmitted to system 102 as a power source 304 to support the system 102 in its sleep mode.

The power 322 is accumulated on supercap 211 to its terminal voltage in order to provide as much charge as possible to system 102 during its active peak power mode. In this particular embodiment, the supercap voltage is $\Delta V \approx 0$ to 5 volts.

Figure 3D:
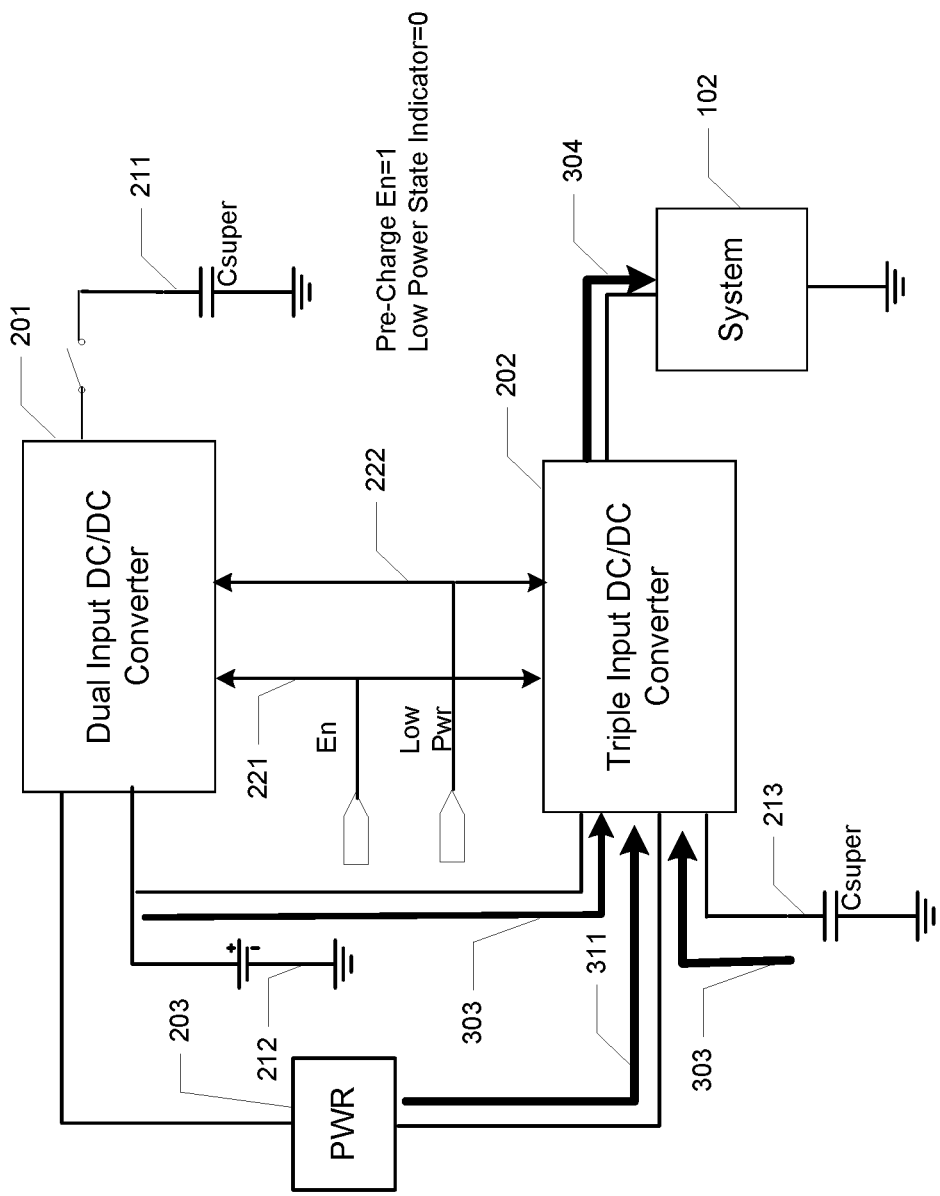

FIG. 3D illustrates the analog control circuit 110 operating in a pre-charged active peak power mode. In the pre-charged active peak power mode, Pre-charge Enable signal 221 may be set to a 1 and Low Power State signal 222 may be set to 0 in this embodiment. This pre-charged active peak power mode supports the system when it exhibits peak power consumption, and therefore supercap was pre-charged to provide additional power following a wakeup.

Dual input DC/DC converter 201 is electrically coupled the harvesting power source 203 to receive power 301 that may be passed as power 302 to battery 212. Triple input DC/DC converter 202 is electrically coupled to battery 212 to receive power 303, electrically coupled to supercap 211 to receive power 303, and harvesting power source 203 is electrically coupled to triple input DC/DC converter 202 to provide power 311 to triple input DC/DC converter 202, all of which is transmitted to system 102 as a power source 304.

While FIG. 3D is shown as discussed above, harvesting power source 203 may simultaneously feed power to the battery 212 and triple input DC/DC converter 202, while triple-input converter is also being fed by battery 212 and supercap 211, if harvesting power source 203 is capable of supporting both connections. Additionally, harvesting power source 203 may only provide power to battery 212 while triple input DC/DC converter 202 is provided power by only battery 212 and supercap 211 in alternate embodiments.

In this mode, none of the power sources are electrically coupled to dual input DC/DC converter 201. Supercap 211 is also not electrically coupled to dual input DC/DC converter 201. In this particular embodiment, the supercap voltage is $\Delta V \approx 5$ to 0 volts. During this mode, Max Power Out is $Max_{PowerOut} \approx Max_{PowerIn} + C_{super} * V_{super}^2 / Time_{maxload}$.

Figure 4A:
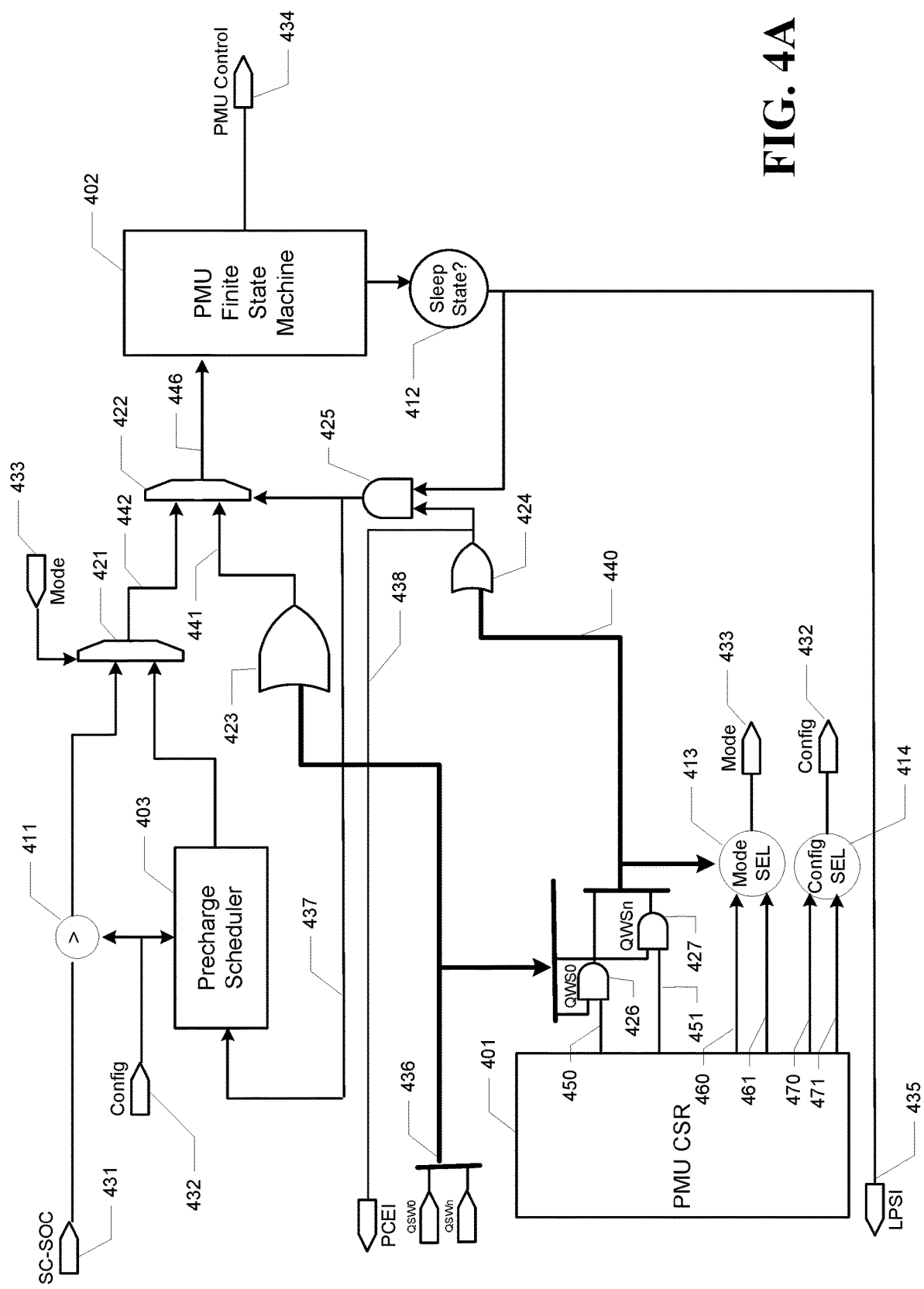
FIG. 4A is a block diagram of a digital logic portion of the power management unit according to an embodiment.

FIG. 4A is a block diagram of a digital logic portion of the PMU according to an embodiment. The digital control circuit 111 of the PMU 101, illustrated in FIG. 4A, generates the necessary PMU 101 control signals 434 used to determine a current state, or mode as discussed above, for the PMU 101. The wake-up process of system 102 typically begins when one of the qualified system wake-up (QSW) trigger signals 436 $QSW_0$-$QSW_n$ is asserted, typically by an interrupt or external event. A QSW signals 436 corresponds to a signal known to system 102 associated with one or more of the start-up event processes configured within power management unit 101. A QSW signal 436 typically is mapped to an entry within a PMU Control and Status Register (CSR) 401 in which the power requirements for the system 102 upon wakeup are known and the corresponding power mode is defined in the CSR entry. Each entry within the PMU CSR 401 contains a pre-charge enable indicator 450-451, a configuration signal 432 based upon CSR values 470-471, and a pre-charge mode indication 433 upon CSR values 460-461. The functions of these values are described below in more detail with reference to FIG. 4B.

The individual QSW signals 436 are conditionally included/excluded, from the supercap pre-charging logic, by the pre-charge enable indicator 450-451 in their respective entries in the PMU CSR 401. The QSW signals 436 included in the supercap pre-charging logic should be those QSW signals 436 representing system wake conditions that will require peak power consumption after wakeup. The conditional inclusion/exclusion is carried out as a logical conjunction using an AND gate 426, 427. The set of all the QSW signals included in the supercap pre-charging logic controls the generation of the mode signal 433 and configuration signal 432 using select logic 413, 414 respectively.

The set of all the QSW signals included in the supercap pre-charging logic 440 is combined in OR gate 424 which will generate a scheduled pre-charge wake enable signal 437 each time one or more of the QSW signals 436 signal that requires a supercap pre-charge before system wakeup. A simple wake-up event signal 441 is created using OR gate 423 which OR gate 423 combines all the QSW signals 436, whether or not they are included in the supercap pre-charge logic. This simple wake-up event signal 441 provides an indication each time there is at least one asserted qualified wake condition 436, i.e. each time the system needs to wake, either with or without supercap pre-charge, and is input into one of two inputs of multiplexer 422.

A pre-charge wake event signal 442 is the second input to multiplexer 422. The pre-charge wake event signal 442 is generated by second multiplexer 421 which is controlled by the mode signal 433 generated by the mode selection logic 413 according to the entries from the PMU CSR 401. The second multiplexer 421 utilizes a scheduled pre-charge completed signal 443 that is the output of pre-charge scheduler 403 for one of its inputs. The second multiplexer 421 utilizes a monitored pre-charge completed signal 444 that is an output of comparator 411 for its second input. Depending upon the value of the mode signal 433, the second input to multiplexer 422 corresponds to either the scheduled pre-charge completed signal 443 or the monitored pre-charge completed signal 444.

The comparator 411 accepts as one input a supercap state-of-charge (SC-SOC) signal 431 and the configuration signal 432, generated by the configuration selection logic 414 according to the entries of the PMU CSR 401, as a second input. The SC-SOC signal 431 corresponds to a signal indicating the current voltage level of the supercap. As such, a numerical value (threshold) for a voltage may be defined using the configuration signal 432 such that the comparator will generate a signal when the SC-SOC 431 signal is greater than the voltage defined by configuration signal 432. The comparator 411 generates a monitored pre-change completed signal 445 when the SC-SOC 431 threshold is met.

Pre-charge scheduler 403 is a logic block that accepts as an input the configuration signal 432. The pre-charge scheduler 403 utilizes the multi-bit config signal as a count value for a counter device within the pre-charge scheduler 403 that determines the pre-charge time period for the supercap 211. As such, both inputs to second multiplexer 421 indicate when supercap 211 has been pre-charged to a pre-determined voltage level as defined by a measured pre-charge level or a pre-charge time period.

The output of multiplexer 422, identified as a PMU wake event signal 446 is passed to PMU Finite State Machine 402 when the digital control circuit 111 is in a pre-charge enable state. The scheduled pre-charge trigger signal 437 is defined by the output of AND gate 425 which is the logical AND of a Pre-Charge Enable Indicator (PCEI) signal 438 generated by OR gate 424 and an low power state indication (LPSI) signal 435 from sleep state logic 412. This LPSI signal 435 indicates that the system 102 is currently in a sleep mode. The PCEI signal 438 indicates that there is at least one asserted QSW signal 436 that requires use of supercap 211 pre-charge before system wake-up.

The LPSI signal 435 also identifies a sleep mode in which a pre-charge activity occurs so that a pre-charged supercap 211 may provide additional power to system 102 when a peak power activity occurs on wake up. LPSI signal 435 is also used by the analog circuit 110 of FIG. 1 as it belongs to the interface between digital control circuit 111 and analog control circuit 110.

Using the above logic, the scheduled pre-charge trigger signal 437 is active when the system 102 is in a sleep mode as indicated by LPSI signal 435 and at least one asserted QSW signal 436 requiring a supercap pre-charge before system wakeup. The scheduled pre-charge trigger signal 437 is also passed to pre-charge scheduler 403 to indicate if its counter should be operating to count down the pre-charge time period. The PCEI signal 438 may also be used in the analog circuit control 110 to indicate the state of the converters used to charge supercap 211.

PMU finite state machine 402 controls the states of the system 102 using the PMU control signals 434. The PMU finite state machine 402 may generate the PCEI signal 438 and the LPSI signal 435. These two signals are used to place the PMU 101 into one of the four states of operation defined above in FIGS. 3A-4D. These four modes correspond to the non-pre-charging sleep/low power mode of FIG. 3A, the non-pre-charged active system low power required mode of FIG. 3B, the pre-charging sleep/low power mode of FIG. 3C, and the pre-charged active peak power mode of FIG. 3D. PMU finite state machine 402 provides an input to sleep state logic 412 used to generate its LPSI signal 435.

Figure 4B:
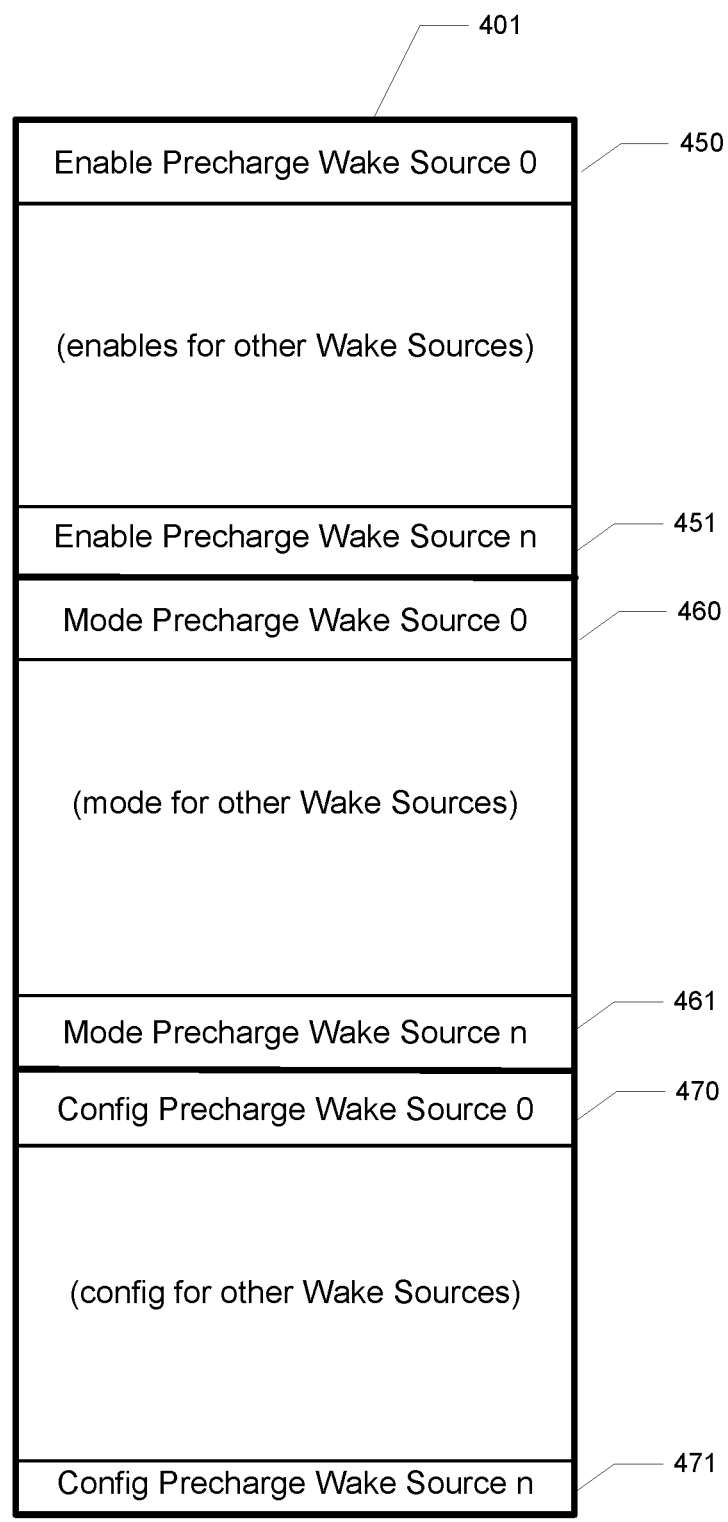
FIG. 4B is a block diagram a control and status register contents for use within the digital logic portion of the power management unit according to an embodiment.

FIG. 4B is a block diagram a control register contents for used within the digital logic portion of the power management unit according to an embodiment. The PMU CSR 401 contains three sets of values for each of the wake sources $WS_0$-$WS_n$. The first set of control register values correspond to pre-charge enable signals 450-451 for $WS_0$-$WS_n$. The pre-charge enable signal is typically a single bit value that indicates if a particular QSW signal 436 utilizes a pre-charge sequence for supercap 211 providing additional charge during a peak power event. The second set of control register values correspond to pre-charge mode signals 460-461 for $WS_0$-$WS_n$.

This pre-charge mode signal is typically a single bit value that indicates if a particular QSW signal 436 utilizes a time-based or a threshold-based pre-charge sequence for supercap 211 providing additional charge during a peak power event. The third set of control register values correspond to Pre-charge config signals 470-471 for $WS_0$-$WS_n$. This pre-charge config signal is typically a multi-bit value that indicates value to define a time period or a voltage threshold to be used in the pre-charge of supercap 211. These signal values are used within the digital control circuit 111 of the PMU 101 as discussed above. The signals may be represented as a single bit value or a multi-bit value as needed. The PMU CSR 401 may be represented with a block of memory addressed by the incoming qualified wake source ID 436 as discussed above. The memory may be non-volatile or read-write storage to permit dynamic configuration of the wake sequence for a given qualified wake source.

Figure 5:
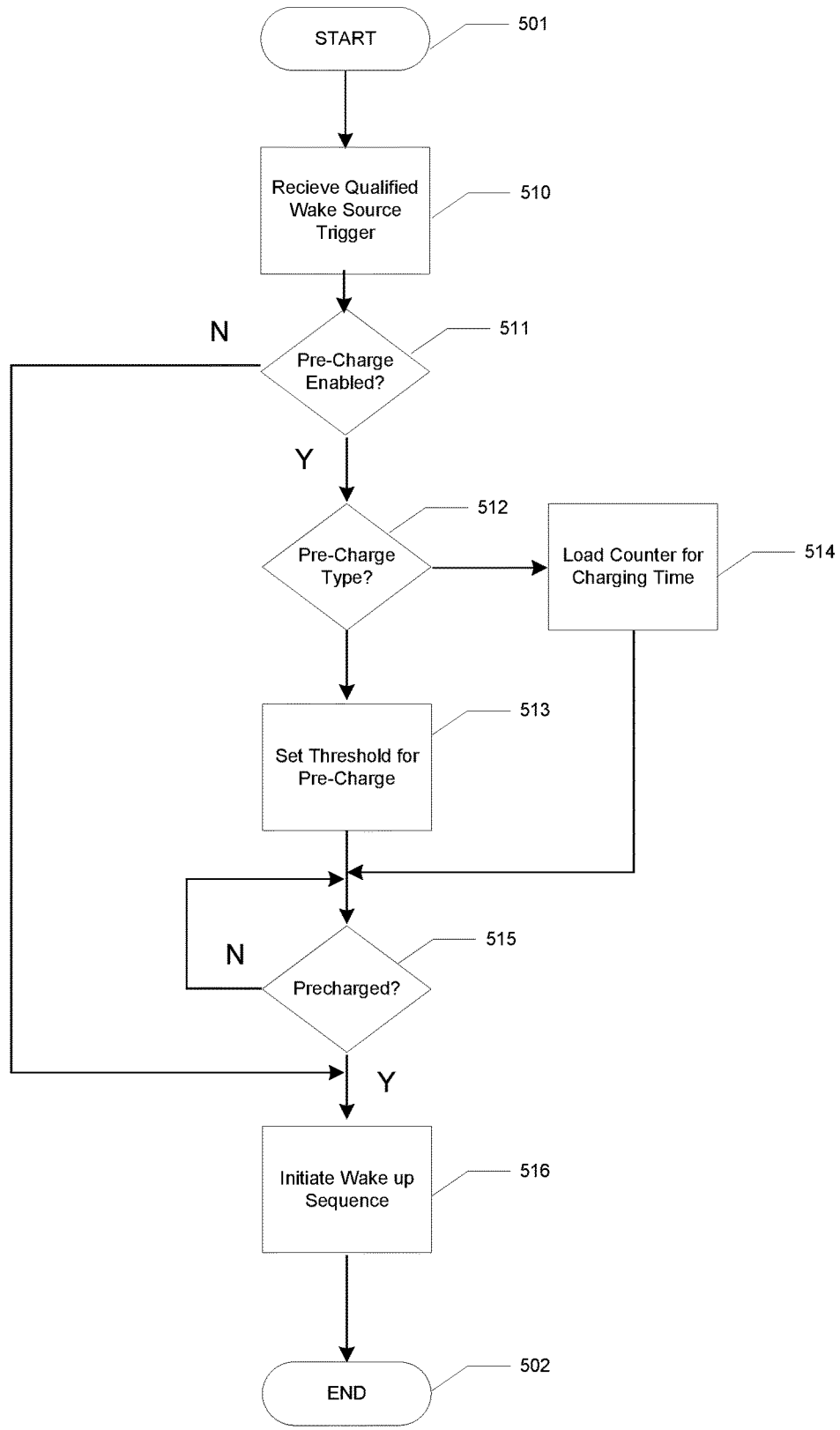
FIG. 5 is a flowchart of the operation of a power management unit according to an example embodiment.

FIG. 5 is a flowchart of the operation of a power management unit according to an example embodiment. The process begins 501 and block 510 receives a QSW source trigger signal. As noted above, a qualified wake source indicates that the source of the trigger signal is entitled to wake up the system 102. Decision block 511 determines if a pre-charging supercap 211 is required using a corresponding entry in the PMU CSR 401 that indicates whether supercap pre-charge is required or not. If a pre-charging supercap 211 not required, the process proceeds to processing block 516 to initiate a wake-up of system 102. If decision block 511 determines that pre-charge supercap mode is to be used, the process continues to decision block 512.

Decision block 512 determines whether the trigger signal is a trigger that utilizes a charging time pre-charge mode or a voltage threshold pre-charge mode. If decision block 512 determines a time charging time pre-charge mode is to be used, processing block 514 loads a timer within the pre-charge scheduler 403 with a value from selected configuration signal 432 to define how long a charging time period should be used to charge supercap 211. The processing continues to decision block 515. If decision block 512 determines a time charging time pre-charge mode is not to be used, processing block 513 loads a comparator within comparator 411 with a value from selected configuration signal 432 to define how a threshold voltage should be used to charge supercap 211. The processing also continues to decision block 515.

Decision block 515 determines if the supercap 211 has been pre-charged to a specified voltage. If the pre-charge mode is the charging time pre-charge mode, decision block 515 determines if the timer has expired. If not, the decision block 515 waits. Similarly, If the pre-charge mode is the threshold pre-charge mode, decision block 515 determines if the current voltage of the supercap 211 exceeds the threshold. If not, the decision block 515 waits. Once the pre-charge condition is met, processing block 516 initiates a wake-up sequence and utilizes the supercap 211 to provide additional charge to the system 102 to meet the needs during the peak power mode. Once the wake up occurs, the processing of the pre-charge process ends.

Figure 6:
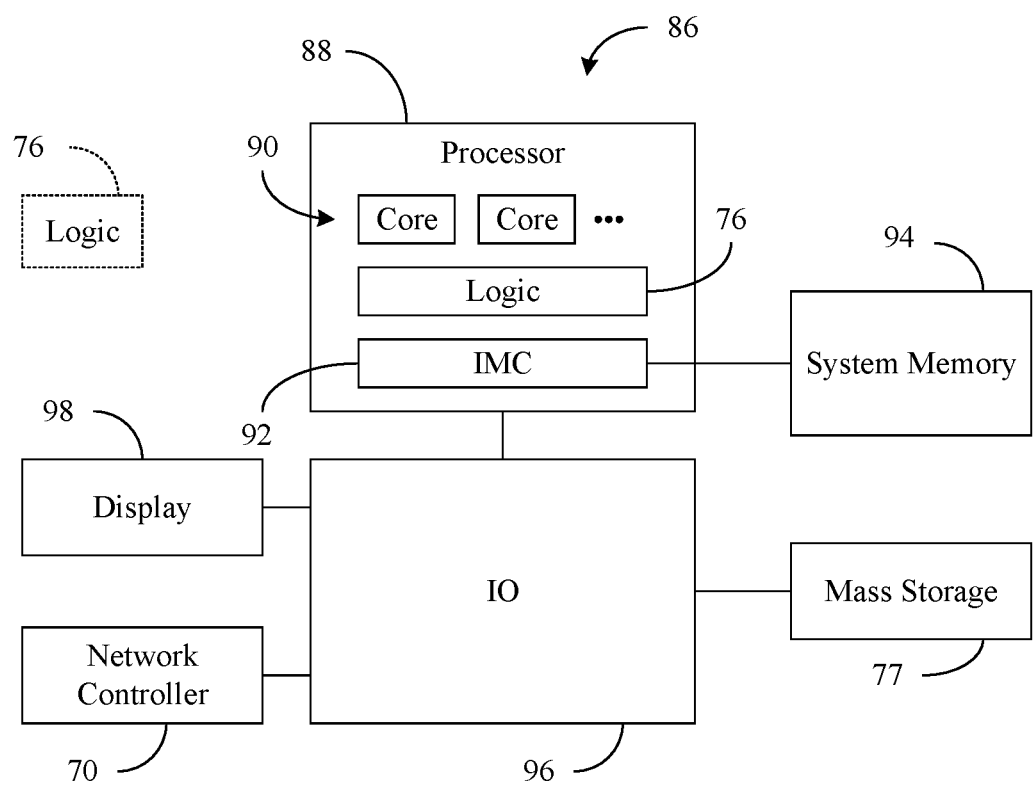
FIG. 6 is an illustration of an example of a computing system according to an embodiment.

FIG. 6 shows a computing system 86. The computing system 86 may be part of an electronic device/platform having computing functionality (e.g., personal digital assistant/PDA, notebook computer, tablet computer, convertible tablet, server, HPC system), communications functionality (e.g., wireless smart phone), imaging functionality, media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 86 includes a processor 88 having a plurality of cores 90 to execute an application and an integrated memory controller (IMC) 92, which may communicate with system memory 94. The system memory 94 may include, for example, dynamic random access memory (DRAM) configured as one or more memory apparatus such as, for example, dual inline memory modules (DIMMs), small outline DIMMs (SODIMMs), etc.

The illustrated system 86 also includes an input output (IO) apparatus 96 implemented together with the processor 88 on a semiconductor die (not shown) as a system on chip (SoC), wherein the IO apparatus 96 functions as a host device and may communicate with, for example, a display 98 (e.g., touch screen, liquid crystal display/LCD, light emitting diode/LED display), a network controller 70, and mass storage 77 (e.g., hard disk drive/HDD, optical disk, flash memory, etc.). The illustrated processor 88 may execute logic 76 that obtains processor operating state information. The logic 76 may also obtain QSW signal information. Thus, the logic 76 may implement one or more aspects of the method 500 (FIG. 5) and may function similarly to the PMU 101 (FIG. 1). The logic 76 may alternatively be implemented elsewhere in the system 86. Additionally, the display 98 may visually present result information associated with execution of the application.

Additional Notes and Examples

Example 1 may include a system including a sleep enabled electronic device, a supercap coupled to one or more power sources, an always-on power management unit, and an analog peak power control apparatus. The always-on power management unit includes a digital power up apparatus containing first logic to receive a qualified system wake-source trigger, initiate pre-charging of the supercap and initiate a wake-up of the sleep enabled electronic device when the supercap is pre-charged to a desired charge level. The analog peak power control contains second logic to enable the pre-charging of the supercap and connect the supercap to the sleep enabled electronic device when the digital power up apparatus initiates the wake-up of the sleep enabled electronic device.

Example 2 may include the system of Example 1, wherein the second logic is to pre-charge the supercap to a terminal voltage.

Example 3 may include the system of Example 1, wherein the first logic is to pre-charge supercap for a specified amount of time.

Example 4 may include the system of Example 1, wherein the first logic is to pre-charge the supercap until a state of charge state for the supercap is greater than a specified voltage.

Example 5 may include the system of Example 1, wherein the first logic is to further initiate the wake-up of the sleep enabled electronic device without pre-charging the supercap based upon a pre-charge configuration value having an enable indicator for the received qualified system wake-source trigger.

Example 6 may include the system of Example 1, the pre-charge configuration value for the received qualified system wake-source trigger is to further comprise a configuration mode value and a configuration pre-charge value.

Example 7 may include the system of Example 1, wherein the first logic is to receive one or more qualified system wake-source triggers and maintains pre-charge enable configuration value for each of the one or more qualified system wake-source triggers.

Example 8 may include an always on power management apparatus including a digital power up logic containing first logic implemented at least partly in one or more of configurable logic or fixed-functionality hardware logic, wherein the first logic is to: receive a qualified system wake-source trigger, initiate pre-charging of a supercap coupled to one or more low power sources, and initiate a wake-up of an attached sleep enabled electronic device when the supercap is precharged to a desired charge level.

Example 10 may include the apparatus of Example 9, wherein digital power up apparatus pre-charge the supercap to a terminal voltage.

Example 11 may include the apparatus of Example 9, wherein the first logic is to pre-charge supercap for a specified amount of time.

Example 12 may include the apparatus of Example 9, wherein digital power up apparatus pre-charges the supercap until a state of charge state for the supercap is greater than a specified voltage.

Example 13 may the apparatus the system of Example 9, wherein the digital power up further initiates the wake-up of the sleep enabled electronic device without pre-charging the supercap based upon a pre-charge configuration value having an enable indicator for the received qualified system wake-source trigger.

Example 14 may the apparatus the system of any one of the Examples 8 to 13, the pre-charge configuration value for the received qualified system wake-source trigger is to further comprise a configuration mode value and a configuration pre-charge value.

Example 15 may include the apparatus of Example 8, wherein the digital power up apparatus receives one or more qualified system wake-source triggers and maintains pre-charge enable configuration value for each of the one or more qualified system wake-source triggers.

Example 16 may include a method receiving a qualified system wake-source trigger for a sleep enabled electronic device, initiating pre-charging of a supercap coupled to one or more low power sources, and initiating a wake-up of the sleep enabled electronic device when the supercap is pre-charged to a pre-defined charge level.

Example 17 may include the method of Example 16, wherein the supercap is pre-charged to a terminal voltage.

Example 18 may include the method of Example 16, wherein the supercap is pre-charged to a terminal voltage.

Example 19 may include the method of Example 16, wherein the supercap is pre-charged until a state of charge state for the supercap is greater than a specified voltage.

Example 20 may include the method of example 16, further comprising initiating the wake-up of the sleep enabled electronic device without pre-charging the supercap based upon a pre-charge configuration value having an enable indicator for the received qualified system wake-source trigger.

Example 21 may include the method of any of the Examples 16 to 20, wherein pre-charge configuration value for the received qualified system wake-source trigger further comprises a configuration mode value and a configuration pre-charge value.

Example 22 may include the method of Example 16, wherein the qualified system wake-source triggers includes one or more qualified system wake-source triggers and each of the one or more qualified system wake-source triggers utilizes a separate pre-charge enable configuration value.

Example 23 may include the method of Example 16, wherein the method further comprising connecting the supercap to the sleep enabled electronic device when the supercap is pre-charged.

Example 24 may include an always-on power management unit for providing additional peak power charge to a power computing device having a means for receiving a qualified system wake-source trigger for a sleep enabled electronic device, means for initiating pre-charging of a supercap coupled to one or more low power sources, and means for initiating a wake-up of the sleep enabled electronic device when the supercap is pre-charged to a pre-defined charge level.

Example 25 may include the always-on power management unit of Example 24, wherein the supercap is pre-charged to a terminal voltage.

Example 26 may include the always-on power management unit of Example 24, wherein the supercap is pre-charged to a terminal voltage.

Example 27 may include the always-on power management unit of Example 24, wherein the supercap is pre-charged until a state of charge state for the supercap is greater than a specified voltage.

Example 28 may include the always-on power management unit of Example 24, further comprising initiating the wake-up of the sleep enabled electronic device without pre-charging the supercap based upon a pre-charge configuration value having an enable indicator for the received qualified system wake-source trigger.

Example 29 may include the always-on power management unit of Example 28, wherein pre-charge configuration value for the received qualified system wake-source trigger further comprises a configuration mode value and a configuration pre-charge value.

Example 30 may include the always-on power management unit of Example 24, wherein the qualified system wake-source triggers includes one or more qualified wake-source triggers and each of the one or more qualified system wake-source triggers utilizes a separate pre-charge enable configuration value.

Example 31 may include the always-on power management unit of Example 24, wherein the method further comprising connecting the supercap to the sleep enabled electronic device when the supercap is pre-charged.

Techniques described herein may therefore employ an PMU 101 that collects information not only from the cores but also performance information from the application. Such an approach may enable the solution to provide additional charge to a system 102 when operating in a peak power mode. As a result, scalability may be greatly improved for future processors with, for example, hundreds of cores.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a sleep enabled electronic device;
a super capacitor selectively coupled to a plurality of power sources;
a power management unit including:
a digital power up apparatus containing first logic to:
receive a qualified system wake-source trigger;
initiate pre-charging of the super capacitor; and
initiate a wake-up of the sleep enabled electronic device when the super capacitor is pre-charged to a desired charge level; and
an analog peak power control apparatus containing second logic to:
enable a first power source of the plurality of power sources to charge a second power source of the plurality of power sources while the plurality of power sources is to be electrically disconnected from the super capacitor;
enable the pre-charging of the super capacitor to pre-charge the super capacitor from the plurality of power sources while one or more of the plurality of power sources is to provide power to the sleep enabled electronic device; and
in response to the digital power up apparatus causing the initiation of the wake-up of the sleep enabled electronic device, connect the super capacitor and the plurality of power sources to the sleep enabled electronic device and electrically disconnect the plurality of power sources from each other and the super capacitor.

2. The system of claim 1, wherein the second logic is to pre-charge the super capacitor to a terminal voltage.

3. The system of claim 1, wherein the first logic is to pre-charge the super capacitor for a specified amount of time.

4. The system of claim 1, wherein the first logic is to pre-charge the super capacitor until a state of charge for the super capacitor is greater than a specified voltage.

5. The system of claim 1, wherein the first logic is to further initiate the wake-up of the sleep enabled electronic device without pre-charging the super capacitor based upon a pre-charge configuration value having an enable indicator for the received qualified system wake-source trigger.

6. The system of claim 5, wherein the pre-charge configuration value for the received qualified system wake-source trigger is to further comprise a configuration mode value and a configuration pre-charge value.

7. The system of claim 1, wherein the first logic is to receive one or more qualified system wake-source triggers and maintain a pre-charge enable configuration value for each of the one or more qualified system wake-source triggers.

8. A power management unit comprising:
a digital power up apparatus containing first logic implemented at least partly in one or more of configurable logic or fixed-functionality hardware logic, wherein the first logic is to:
receive a qualified system wake-source trigger;
initiate pre-charging of a super capacitor selectively coupled to one or more of a plurality of power sources; and
initiate a wake-up of a sleep enabled electronic device when the super capacitor is pre-charged to a desired charge level; and
an analog peak power control apparatus containing second logic implemented at least partly in one or more of configurable logic or fixed-functionality hardware logic, wherein the second logic is to:
enable a first power source of the plurality of power sources to charge a second power source of the plurality of power sources while the plurality of power sources is to be electrically disconnected from the super capacitor;
enable a pre-charge of the super capacitor to pre-charge the super capacitor from the plurality of power sources while one or more of the plurality of power sources is to provide power to the sleep enabled electronic device; and
in response to the digital power up apparatus causing the initiation of the wake-up of the sleep enabled electronic device, connect the super capacitor and the plurality of power sources to the sleep enabled electronic device and electrically disconnect the plurality of power sources from each other and the super capacitor.

9. The unit of claim 8, wherein the analog peak power control apparatus is to pre-charge the super capacitor to a terminal voltage.

10. The unit of claim 8, wherein the digital power up apparatus is to pre-charge the super capacitor for a specified amount of time.

11. The unit of claim 8, wherein the digital power up apparatus is to pre-charge the super capacitor until a state of charge for the super capacitor is greater than a specified voltage.

12. The unit of claim 8, wherein the digital power up apparatus is to further initiate the wake-up of the sleep enabled electronic device without pre-charging the super capacitor based upon a pre-charge configuration value having an enable indicator for the received qualified system wake-source trigger.

13. The unit of claim 12, wherein the pre-charge configuration value for the received qualified system wake-source trigger further comprises a configuration mode value, and a configuration pre-charge value.

14. The unit of claim 8, wherein the digital power up apparatus is to receive one or more qualified system wake-source triggers and maintain a pre-charge enable configuration value for each of the one or more qualified system wake-source triggers.

15. A method comprising:
receiving a qualified system wake-source trigger for a sleep enabled electronic device;
initiating pre-charging of a super capacitor selectively coupled to a plurality of power sources;
initiating a wake-up of the sleep enabled electronic device when the super capacitor is pre-charged to a pre-defined charge level;
enabling a first power source of the plurality of power sources to charge a second power source of the plurality of power sources while the plurality of power sources is to be electrically disconnected from the super capacitor;
enabling the pre-charging of the super capacitor to pre-charge the super capacitor from the plurality of power sources while one or more of the plurality of power sources is providing power to the sleep enabled electronic device; and
in response to the initiating the wake-up of the sleep enabled electronic device, connecting the super capacitor and the plurality of power sources to the sleep enabled electronic device and electrically disconnecting the plurality of power sources from each other and the super capacitor.

16. The method of claim 15, wherein the super capacitor is pre-charged to a terminal voltage.

17. The method of claim 15, wherein the super capacitor is pre-charged for a specified amount of time.

18. The method of claim 15, wherein the super capacitor is pre-charged until a state of charge for the super capacitor is greater than a specified voltage.

19. The method of claim 15, further comprising initiating the wake-up of the sleep enabled electronic device without pre-charging the super capacitor based upon a pre-charge configuration value having an enable indicator for the received qualified system wake-source trigger.

20. The method of claim 19, wherein the pre-charge configuration value for the received qualified system wake-source trigger further comprises a configuration mode value and a configuration pre-charge value.

21. The method of claim 15, further comprising receiving one or more qualified system wake-source triggers and each of the one or more qualified system wake-source triggers utilizes a separate pre-charge enable configuration value.

22. The method of claim 15, wherein the method further comprises connecting the super capacitor to the sleep enabled electronic device when the super capacitor is pre-charged.

* * * * *